United States Patent [19]

Weiser et al.

[11] 3,879,855

[45] Apr. 29, 1975

[54] MANUFACTURE OF NON-DUSTING OR VIRTUALLY NON-DUSTING DYE GRANULES

[76] Inventors: Dieter Weiser, 14 Berliner Strasse, 6700 Ludwigshafen; Dieter Stockburger, 12 Philipp-Kranz Strasse, 6718 Gruenstadt; Peter Thoma, 26 Carl-Bosch-Ring; Hans-Joachim Klocke, 1b Weidenstrasse, both of 6710 Frankenthal; Hans-Jochen Beyse, 46 Pfalzgrafenstrasse, 6700 Ludwigshafen; Heinz Thomae, 14d Ludwigshafener Strasse, 6710 Frankenthal, all of Germany

[22] Filed: Dec. 19, 1973

[21] Appl. No.: 426,371

[30] Foreign Application Priority Data
Dec. 29, 1972 Germany.......................... 2263968

[52] U.S. Cl.................................... 34/10; 34/57 R
[51] Int. Cl.................................................. F26b 3/08
[58] Field of Search........... 34/10, 57 R, 57 D, 57 E

[56] References Cited
UNITED STATES PATENTS

| | | | |
|---|---|---|---|
| 3,212,197 | 10/1965 | Crawford | 34/10 |
| 3,475,132 | 10/1969 | Seifert et al. | 34/57 R |
| 3,748,745 | 7/1973 | Sachs et al. | 34/10 |
| 3,795,057 | 3/1974 | Fanaritis | 34/10 |

*Primary Examiner*—John J. Camby
*Attorney, Agent, or Firm*—Johnston, Keil, Thompson & Shurtleff

[57] ABSTRACT

A process for the manufacture of non-dusting dye granules from an aqueous formulation of highly dispersed water-insoluble dyes by spraying the formulation, which contains adhesive compounds, into a fluidized bed of pulverulent dispersing agent, dye or mixture thereof. The resulting granules possess excellent redispersibility, which is important in using them.

11 Claims, 1 Drawing Figure

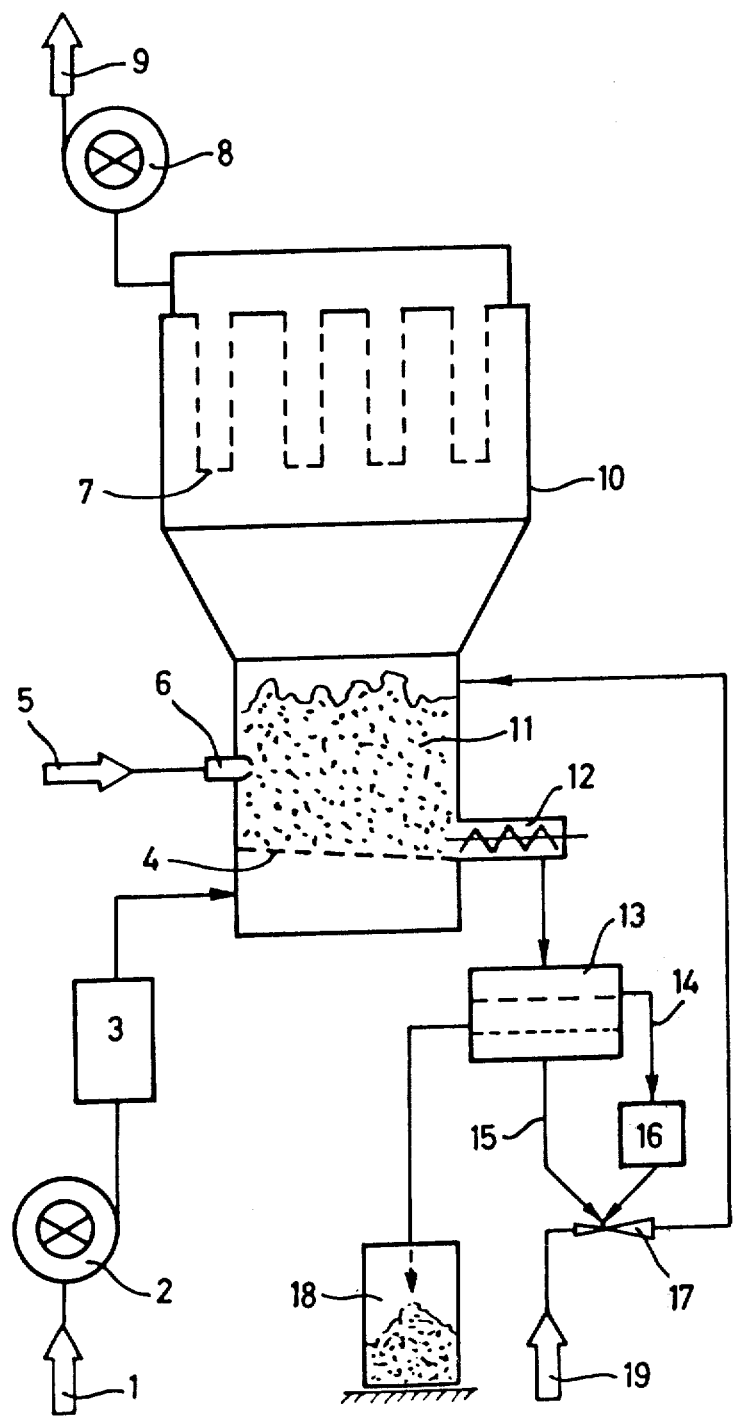

MANUFACTURE OF NON-DUSTING OR VIRTUALLY NON-DUSTING DYE GRANULES

The invention relates to a process for the manufacture, in a fluidized bed, of non-dusting or substantially non-dusting dye granules from aqueous formulations which contain highly dispersed water-insoluble dyes.

Alongside the vacuum drying cabinets, through-circulation dryers or paddle dryers, which have been known for a long time and only permit batchwise drying, dryers such as band or roller dryers, grinding dryers, thin layer contact dryers and above all spray dryers, in which drying can be carried out continuously, have been increasingly adopted for drying dispersed aqueous dye formulations. In recent times, freeze-drying, which is laborious and therefore expensive, has also been used for drying sensitive formulations.

The aqueous formulations which contain highly dispersed water-insoluble dyes and are used to manufacture the commercial vat dyes and disperse dyes can be dried advantageously by spray drying at temperatures of, for example, less than 100°C, giving products ranging from powders to beads in which the dyes are in a finely divided form, as they were in the aqueous formulation. For this reason, various types of spray dryers, for example with one-component nozzles or two-component nozzles or with disk atomization, have become accepted for drying these sensitive formulations.

A disadvantage from which all known drying equipment suffers is that the resulting dried product consists of a mixture of coarse and fine particles and therefore the lumpy products obtained produce a great deal of dust. However, the users demand dyes and dye formulations which produce little or no dust, in order to avoid unpleasant conditions for the operator and also to prevent soiling of the working areas. Some dye manufacturers have therefore undertaken the manufacture of dyes in the form of granules, capsules or tablets. However, the manufacture of such shaped materials is expensive. A further disadvantage is that it is difficult completely to redisperse these formulations in water so that highly dispersed dyes, such as are required for dyeing with vat dyes and disperse dyes, are not usually marketed in the forms mentioned.

To reduce the tendency of the pulverulent highly dispersed formulations to dust, anti-dusting agents such as oils are sometimes added to the powders obtained by spray drying. Many of the highly dispersed powder formulations are nowadays marketed in this form. However, this type of formulation suffers from the disadvantage that not all dyes can, by this method, be made as low-dusting as would be desired. The use of anti-dusting agents often entails the disadvantage that the fine state of subdivision of the dyes may deteriorate in the formulations, or that on prolonged storage the non-dusting properties may be lost. It is a further disadvantage that the non-dusting formulations frequently tend to form lumps when stirred into water and this can only be overcome by vigorous stirring. If this problem is not heeded, difficulties can arise during dyeing and/or printing. It is also possible to effect drying in spray dryers in such a way that some of the dried material is produced in the form of small non-dusting "grains." However, at the same time some very fine dusty powder is always produced and this must be removed from the beads by, for example, sieving. The sieved powder is either rendered non-dusting by conventional methods or is stirred up with water and again dried in a spray dryer, to give beads. However, because of the recycling, repeated moistening and drying of the highly dispersed dye, the latter process entails additional drying costs. Furthermore, the state of subdivision of such formulations deteriorates because of repeated heating in the presence of water.

Furthermore, the grains thus obtained suffer from the disadvantage of inadequate mechanical stability, which is why dust is produced during lengthy transport through friction.

It is an object of the present invention to provide a drying process in which the dried product is obtained in the form of mechanically stable granules and which does not suffer from the said disadvantages of the known drying processes. Furthermore, the process also permits very sensitive highly dispersed dye formulations to be dried with high space-time yields, whilst preserving the finely divided state.

We have found that formulations of highly dispersed dyes, in the form of non-dusting or virtually non-dusting dye granules can be manufactured, without adversely affecting the fine state of subdivision of the dye, if an aqueous formulation, containing adhesive compounds, of highly dispersed water-insoluble dyes is sprayed into a fluidized bed of pulverulent dye, dispersing agent or a mixture thereof.

The discharge from the fluidized bed consists of solid granules which are mechanically strong so that no dye, or virtually no dye, is abraded even if the granules rub against one another for a very long period.

The process of the invention is carried out by spraying the aqueous highly disperse formulation, for example by means of nozzles, into a fluidized bed which contains, for example, pulverulent dusty dye. As a rule, the nozzles are so arranged that the orifices are located within the fluidized bed. The direction of flow from the nozzles is preferably toward the center of the fluidized bed. For the fluidized bed to grow, it is necessary that the particles produced from the injected dispersion should stick to the particles present in the fluidized bed. The adhesive compounds used are as a rule the dispersing agents which are contained in the formulations and are required to produce these highly dispersed formulations.

The amounts of adhesive agent can vary within wide limits. The upper limit is represented by pure adhesive agent whilst the lower limit is determined by the system of dye/dispersing agent/water which is to be dried and the adhesiveness of the adhesive or dispersing agent. As a rule, the addition of less than 5 per cent by weight of dispersing agent, based on dispersed dye, will not give mechanically stable fluidizable granules. However, it is entirely possible for a dye which inherently tends to stick together to be dried to give granules even if only a small amount of adhesive agent is added.

Highly dispersed aqueous dye formulations are to be understood as dispersions with primary particles of size about 1 $\mu$ or less.

The highly dispersed dye formulations are produced by conventional methods, through grinding or kneading an aqueous suspension of the particular dyes, in the presence of dispersing agents. The comminution can be effected in, for example, a sand mill, Perl mill, attrition mill, ball mill or a kneader.

The concentration of water-insoluble dye can vary within wide limits, and depends on the dye and the dispersing agent. The concentration is selected so that the mixture can be stirred before, during and after grinding, and can be ground. As a rule, it is between 5 and 50 percent by weight and preferably between 7 and 30 percent by weight, based on the highly dispersed aqueous formulation.

The amount by weight of dispersing agent is generally 1 to 10 times, and preferably 1.5 to 8 times, that of the dye.

Examples of suitable dispersing agents for stabilizing the highly dispersed formulations are ligninsulfonic acids, condensation products of naphthalenesulfonic acid, naphtholsulfonic acid and/or naphthylaminosulfonic acid and formaldehyde, condensation products of phenolsulfonic acid with urea and formaldehyde, which are optionally after-treated with phenol and formaldehyde, or condensation products of phenol, formaldehyde and sodium sulfite.

The adhesive dispersing agent can also, for example, be sprayed into the fluidized bed simultaneously with the liquid dye formulation, but through a separate nozzle.

The entry temperature of the stream of gas used to produce the fluidized bed and to dry the injected dye formulation is as a rule several tens of degrees centigrade higher than the maximum possible gas entry temperature in spray dryers. In these, the gas entry temperatures are generally between 70° and 120°C and the optimum is about 90°C. The gas entry temperatures of the drying gas in the process of the invention are between 35° and 300° and preferably between 70° and 200°C. depending on the dye, without adversely affecting the state of subdivision in the dried product obtained.

This result was unexpected since an aqueous dye formulation of the same composition is dried in both drying processes.

The size of the granules obtained by the process of the invention can be varied by allowing a greater or lesser residence time of the fluidized material in the bed. In this way the particle size distribution can be influenced so that as large a proportion as possible of the fluidized material which issues is of the desired particle size. The discharge from the fluidized bed is graded and the desired spectrum is isolated as the useful fraction. Undersize granules (fines) are recycled direct to the fluidized bed whilst oversize material (tails) is first comminuted, for example in a mill, and then recycled, and the recycled material is again sprayed with dye dispersion. The maximum size of granules which lend themselves readily to fluidization is as a rule about 10 mm. The lower limit is determined by the desired non-dusting characteristic. The lower limit is in general a particle size of 0.05 to 0.1 mm. The fraction used for commercial dyes, also referred to as the useful fraction, is generally in the range of 0.3 to 10, and preferably 0.5 to 2.5 mm. particle diameter.

In order to avoid losses from entrainment of dust by the fluidizing gas it is desirable to fit a filter or separator after the fluidized bed, in which the particles entrained from the fluidized bed are separated off. These fines can also be recycled into the fluidized bed.

It is an advantage of the drying process according to the invention that the resulting particles of highly dispersed dye formulation are largely produced in the desired size and that the dried material produced which is not in the desired form can be recycled to the fluidized bed without moistening it or completely redispersing it in water. This allows the process to be carried out continuously, with the desired useful fraction being obtained using a sieve and the undesired material being recycled to the fluidized bed either direct or after comminution. The particle size in the fluidized bed is thus controlled by the sieve used and by the grinder used in recycling the tails.

The process according to the invention also permits gentle drying of heat-sensitive dyes and heat-sensitive aqueous dye formulations with very high space-time yields. As a rule, the gas entry temperature can be substantially above that used for drying in a spray tower, without the process of the present invention causing a deterioration of the fine state of subdivision of the dye in the dried material. This result was unexpected since not only is the temperature of the gas introduced for drying and producing the fluidized bed higher, but the residence time of the particles in the fluidized bed is as a rule also substantially longer than the residence time of the material being dried in a spray tower.

Thus, for example, C.I. Disperse Orange 13, C.I. No. 26,080 (Colour Index 1972) can be dried in a stream of fluidizing gas, with an entry temperature of up to 120°C and an exit temperature of about 40°C, to give granules in which the finely divided state is preserved. If, on the other hand, the same aqueous formulation is dried in a spray dryer, the gas entry temperature must not exceed 70°C since otherwise the characteristics of the dried product deteriorate. Similar remarks apply to vat dyes; for example, an aqueous finely dispersed formulation of C.I. Yellow 20, C.I. No. 68,420, can be dried in a fluidized bed, with gas entry temperatures of up to 130°-140°C and exit temperatures of about 60°C, to give granules which satisfy all tinctorial requirements, while the maximum gas entry temperature which can be used in spray drying is 70° to 75°C since otherwise the state of subdivision of the dried material obtained is no longer adequate for dyeing purposes.

A further advantage of the drying process according to the invention, which may also be described as a spray fluidization process, is that it uses relatively high gas velocities of 0.8 to 4.5 m/sec, preferably of 1.5 to 2.5 m/sec, so that high gas throughputs are achieved with a small fluidized bed area. Since, in addition, the height of the fluidized bed is 6 to 10 times less than the height of spray towers, the space-time yield is 25 to 40 times greater in the spray fluidization process than in a spray tower, because of the increased gas throughput. An additional advantage of the spray fluidization process is that relatively low gas exit temperatures of 35° to 120°C, preferably of 40° to 80°C, can be used. The residence time can be readily varied via the height of the fluidized bed. The final moisture content of the dried material can easily be adjusted to the desired figure through selection of the exit temperature.

The process according to the invention has yet a further advantage for the manufacture of dry dye formulations, namely that the aqueous highly dispersed formulations can be used in a concentrated form for the drying process and only during drying are pulverulent dispersing agents or extenders injected into the fluidized bed, simultaneously with the aqueous dye formulation. Thus, homogeneous solid formulations with lower contents of the desired dye are obtained in one step.

The granules obtained according to the process of the invention are irregular in shape. They are solid and do not contain any cavities such as is sometimes the case with spherical particles obtained by spray drying.

The latter form dusty fines through breaking up in transport, while the granules obtained by the process of the invention display no breakage of abrasion even at more than 300,000 revolutions in a baffled drum mixer, that is to say the non-dusting characteristics persist even on shaking and mutual rubbing of the dye granules, such as occurs during transport. The bulk volume of the dry product obtained by the process of the invention is 1.3 to 1.4 l/kg and is thus substantially below the bulk volume of commercial finely dispersed formulations (1.6 to 1.8 l/kg). The granules obtained by the process of the invention can very easily be redispersed in water without forming lumps, for example by simple steeping; this is a great advantage in industrial use of the dyes. In view of the known redispersion characteristics of dyes in tablet, granule or capsule form, this advantageous property of the granules was unexpected.

The Examples which follow explain the process in more detail. The percentages quoted are by weight. The temperatures quoted are in °C.

ILLUSTRATIVE EMBODIMENTS

A. Fluidized Bed Dryer

The aqueous highly dispersed dye formulations, the manufacture of which is described below, are dried in the following apparatus, which is to be described as a fluidized bed dryer (FIGURE).

A fluidized bed (11) of pulverulent dusting dye, dispersing agent or a mixture thereof is first produced in a fluidized bed dryer (10) fitted with a tray (4) and a self-cleaning dust filter installation (7).

Ambient air (1) is drawn in by a blower (2), heated in an air heater (3) and used to produce the fluidized bed (11).

The fly dust entrained from the fluidized bed deposits on the filter cloth of the self-cleansing dust filter installation and drops back into the fluidized bed in the form of lumps. The purified off-gas (9) can be drawn off by means of an extractor fan (8).

Simultaneously with the fluidization of the bed by the hot fluidizing air, sufficient highly dispersed aqueous dye formulation (5) is sprayed continuously into the fluidized bed by means of a plurality of nozzles (6), preferably two-component nozzles (which as a rule are so arranged that the orifices are within the fluidized bed and that the direction of flow from the nozzles is preferably toward the center of the fluidized bed), that the average temperature in the fluidized bed does not exceed 30° to 120°C, and preferably 40° to 60°C. This ensures that the granules produced in the fluidized bed satisfy all tinctorial requirements.

By virtue of this process, solid, mechanically strong granules of irregular shape are obtained at the outlet of the fluidized bed, and these particles are withdrawn continuously by means of a metering screw (12).

The discharge is subjected to a grading process (13), for example by means of a sieve, and is separated into a useful fraction (18) of which the particle diameter preferably lies in the range of 0.5 to 2.5 mm, fines (15) and tails (14).

Whilst the fines (15) are returned directly to the fluidized bed dryer (10) for further granulation, via a pneumatic feed device (17) operated with compressed air (19), the tails (14) must pass through a comminuting device (16), for example a mill, before being recycled.

B. Spray Dryer

For comparison, the same aqueous highly dispersed formulations were dried in a spray dryer manufactured by Lurgi using a two-component nozzle and working at a temperature such that the dried material obtained was still in a finely divided state.

C. Test Methods

The dried materials obtained by the processes according to A and B were assessed by the test methods described below: a. Suction filter test: 5 g of the dried material are dispersed in 1,000 ml of water at 40°C by stirring for 3 minutes. This dispersion is suction filtered on a paper filter (paper: Schleicher & Schüll, Düren, 1450 CV), under a constant vacuum.

The time the dispersion requires to pass through the filter and the appearance of the dried filter paper, are criteria of the state of subdivision. The shorter is the time, the finer is the dispersion provided there are no residues on the filter paper. b. Centrifuging index: 0.5 g of the dried material are introduced into 100 ml of fully demineralized water at 40°C and homogenized by shaking. The resulting dispersion is centrifuged on a centrifuge type Junior III manufactured by Messrs. Christ at 1,000, 2,000 and 4,000 revolutions/minute. The dye which sediments in the individual stages is isolated and its amount is determined photometrically. Finally, the amount of dye which has not sedimented after the third centrifuging is determined. The total amount of dye is taken as 100. From this, the percentages of dye sedimented in the 3 stages, and of the non-sedimented dye, are calculated.

The centrifuging index is quoted in the form that the first number indicates the percentage of sediment at the lowest speed of the centrifuge, the third number indicates the percentages at the highest speed of the centrifuge and the fourth number indicates the proportion of non-sedimented dye.

The percentages are a measure of the state of subdivision of the dried material. The smaller are the first and second numbers, the lower is the proportion of larger particles and the dispersion and hence in the dried formulation. c. The dust index is determined as a measure of dusting.

The measuring apparatus consists of a measuring instrument manufactured by Lange, Berlin and a measuring box on which is fixed a 50 cm high gravity tube surmounted by a supply tube for the sample to be examined. A hopper is rigidly mounted on the supply tube. In the measuring box, on the side at right angles to the direction of fall, there is a light source and a photocell which is connected to the measuring instrument. To determine the dust index, 30 g of dye are rapidly introduced into the measuring box through the gravity tube and the maximum deflection is read off. A further reading is taken after 30 seconds. The value read off are added and the sum represents the dust index.

Formulations of dust index less than 15 are regarded as satisfactorily non-dusting.

The dust indices for the dried material obtained by spray drying are as a rule far above 15. d. The solids content is determined with the "Ultramat" (Gronert system) volatility meter. 10 g of dried material are weighed into the weighing dish and the sample is dried for 30 minutes with an infrared lamp. It is then reweighed and the solids content in percent is read off on the scale.

EXAMPLE 1

An aqueous highly dispersed formulation of the dye of the formula

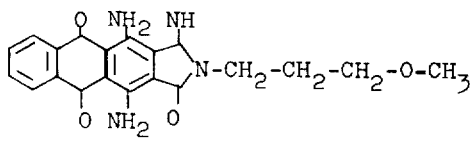

the manufacture of which is described below is dried to give granules, in the fluidized bed described under A, under the following conditions:

Concentration of the formulation: 31 percent of dye and dispersing agent.

Amount of pulverulent dye formulation initially introduced as the fluidized bed: 118 kg/m².

| Temperature | gas inlet: | 150° |
|---|---|---|
| | gas outlet: | 60° |
| Fluidization velocity: 1.3 m/second. | | |

The amount of aqueous dye formulation injected into the fluidized bed is 183 kg/m².hour.

Yield of granular non-dusting formulation: 57 kg/m².hour.

The evaluation of the dried material obtained is set out in Table II.

EXAMPLES 2 TO 9

Granular formulations of the dyes named in Table IA are obtained analogously to the instructions in Example 1, under the conditions mentioned in the table, from the appropriate aqueous highly dispersed formulations. The evaluation of the dried material obtained is set out in Table II.

COMPARATIVE EXAMPLES 1B TO 9B

The highly dispersed formulations described in Examples 1 to 9 are dried, for comparison, in the spray dryer described under B. The gas entry temperature is chosen to be such that the dried material obtained is still in a finely divided state.

The experimental data are listed in Table IB. The assessment of the dried material obtained is set out in Table II.

D. The highly dispersed aqueous dye formulations used in Examples 1 to 9 and 1B to 9B are prepared as follows:

The dye is obtained from its synthesis is homogenized, in the form of the aqueous press cake, with ligninsulfonate (sulfite cellulose waste liquors) and/or condensation products based on napthalenesulfonic acid and formaldehyde (as powders or as an aqueous solution), and optionally with added water, to give a paste of low to medium viscosity, which can be pumped. The paste is next pumped through a corundum disc mill and subsequently through a stirred mill filled with Ottawa sand or glass beads (diameter 1 to 0.4 mm). The state of fine division of the formulation is tested and the grinding on the stirred mill is repeated until a satisfactory suction filter test is obtained.

When the desired state of subdivision is reached, the ground material is pumped through a sieve of 10.10⁴ meshes/cm² and the sieved aqueous formulation is dried in accordance with A or B.

Table IA

| Example | Dye | Gas temperature Entry [°C] | Gas temperature Exit [°C] | Fluidization velocity [m/sec] | Dye initially introduced [kg/m²] | Preparation Concentration [% by weight] | Preparation Amount injected [kg/m².hour] | Yield of useful fraction (0.5 to 2.5 particle diameter) [kg/m².hour] |
|---|---|---|---|---|---|---|---|---|
| 2 | Disperse Orange 13, C.I. No.26,080 | 90 | 40 | 0.3 | 90 | 22.0 | 82 | 18 |
| 3 | Dye I | 120 | 40 | 1.2 | 60 | 20.6 | 95 | 17.5 |
| 4 | Dye II | 145 | 55 | 1.2 | 75 | 21.0 | 198 | 42 |
| 5 | Dye III | 110 | 50 | 1.3 | 53 | 30.9 | 185 | 58 |
| 6 | Vat Red 21, C.I. No. 61,670 | 95 | 45 | 1.4 | 64 | 25.0 | 98 | 25 |
| 7 | Vat Yellow 20, C.I. No. 68,420 | 130 | 60 | 1.3 | 125 | 20.0 | 195 | 42 |
| 8 | Vat Blue 6, C.I. No. 69,825 | 275 | 50 | 1.4 | 65 | 24.0 | 498 | 127 |
| 9 | Pigment Green 7, C.I. No. 74,260 | 130 | 50 | 1.0 | 120 | 32.0 | 118 | 43 |

Dye I: Product of the coupling reaction of 2-nitroaniline with 2-(carbonamidomethyl)-benzimidazole
Dye II: Product of the coupling reaction of 4-aminoazobenzene with 1-methyl-4-hydroxy-quinolone-(2).
Dye III: Product of the coupling reaction of 3-amino-5-nitro-2,1-benzisothiazole with N-β-carbomethoxyethyl-N-ethylaniline.

TABLE IB

Drying of dye formulations in a Lurgi spray dryer using a two-component nozzle
The formulations are the same as those in Examples 1 to 9.

| Example | Gas temperature Entry °C | Gas temperature Exit °C | Preparation Concentration % by weight | Preparation Amount injected kg/1,000 m³. hour | Yield kg/1,000 m³.hour |
|---|---|---|---|---|---|
| 1B | 110 | 74 | 45.0 | 14.9 | 7.1 |
| 2B | 70 | 48 | 22.0 | 7.8 | 1.8 |

TABLE IB — Continued

Drying of dye formulations in a Lurgi spray dryer using a two-component nozzle
The formulations are the same as those in Examples 1 to 9.

| Example | Gas temperature Entry °C | Gas temperature Exit °C | Preparation Concentration % by weight | Preparation Amount injected kg/1,000 m³.hour | Yield kg/1,000 m³.hour |
|---|---|---|---|---|---|
| 3B | 80 | 55 | 20.6 | 9.2 | 2.0 |
| 4B | 90 | 60 | 24.0 | 15.1 | 3.8 |
| 5B | 65 | 50 | 30.9 | 5.2 | 1.7 |
| 6B | 70 | 48 | 25.0 | 12.2 | 3.2 |
| 7B | 80 | 50 | 20.0 | 16.1 | 3.4 |
| 8B | 120 | 73 | 24.0 | 26.5 | 6.7 |
| 9B | 134 | 74 | 32.0 | 34.7 | 11.7 |

Table II

Assessment of the dried material obtained according to Examples 1 to 9, and of the material obtained by spray drying (Example 1B to 9B):

| Example | Suction filter test Flow time sec | Suction filter test Appearance of filter | Centrifuging index | Dust index | Bulk volume liter/kg | Solids content % by weight |
|---|---|---|---|---|---|---|
| 1 | 8 | good | 15/32/27/26 | 1 | 1.25 | 97.5 |
| 1B | 9 | good | 16/33/24/27 | >>15 | 1.7 | 92.5 |
| 2 | 9 | good | 8/8/19/65 | 1 | 1.4 | 94.0 |
| 2B | 10 | good | 2/5/16/77 | >>15 | 1.8 | 93.0 |
| 3 | 9 | good | 10/21/24/45 | 1 | 1.4 | 96.2 |
| 3B | 15 | adequate | 23/27/22/28 | >>15 | 1.65 | 94.5 |
| 4 | 9 | good | 3/13/28/56 | 1 | 1.4 | 95.2 |
| 4B | 10 | good | 3/13/30/54 | >>15 | 1.6 | 92.6 |
| 5 | 8 | good | 3/10/22/65 | 1 | 1.2 | 92.0 |
| 5B | 9 | good | 3/8/19/70 | >>15 | 1.4 | 92.5 |
| 6 | 9 | good[1] | [2] — | 1 | 1.3 | 96.4 |
| 6B | 9 | bad[1] | — | >>15 | 1.7 | 93.5 |
| 7 | 9 | good[1] | — | 6 | 1.4 | 97.6 |
| 7B | 9 | good[1] | — | >>15 | 1.8 | 94.8 |
| 8 | 9 | good[1] | — | 1 | 1.1 | 95.0 |
| 8B | 10 | good[1] | — | >>15 | 1.7 | 94.0 |
| 9 | 18 | good | — | 1 | 1.3 | 96.6 |
| 9B | 34 | good | — | >>15 | 1.6 | 94.4 |

[1] In the case of the vat dyes, calico fabric is used instead of filter paper (calico test)
[2] In the case of the vat dyes, the assessment by the centrifuging test is not carried out.

We claim:

1. A process for the manufacture of substantially non-dusting granules of a water-insoluble dye formulation, which process comprises:
   producing a pulverulent formulation consisting essentially of said dye in admixture with a dispersing agent as a fluidized bed by introducing a fluidizing gas having a temperature of from 35°C. to 300°C.;
   spraying into said fluidized bed an aqueous formulation containing said dye highly dispersed in the water, a dispersing agent and an adhesive compound;
   removing a portion of the fluidized material from the bed;
   separating a portion of the removed material having the desired particle size; and
   recycling at least part of the remaining material of undesired particle size to the fluidized bed.

2. A process as claimed in claim 1, wherein an aqueous formulation of a highly dispersed vat dye or disperse dye is used.

3. A process as claimed in claim 1, wherein an adhesive dispersing agent is sprayed simultaneously with an aqueous dye formulation through separate nozzles into the fluidized bed.

4. A process as claimed in claim 1, wherein pulverulent diluents are sprayed into the fluidized bed simultaneously with the aqueous dye formulation.

5. A process as claimed in claim 1, wherein the temperature of the fluidizing gas is about 70°C. to 200°C.

6. A process as claimed in claim 1 wherein the separated portion of material removed from the fluidized bed has a particle size of about 0.1 to 10 mm.

7. A process as claimed in claim 1, wherein the adhesive compound is the dispersing agent which is used to produce the highly dispersed preparations.

8. A process as claimed in claim 7, wherein ligninsulfonates, condensation products based on naphthalenesulfonic acid, naphtholsulfonic acid or naphthylaminosulfonic acid and formaldehyde, condensation products of phenolsulfonic acids with urea and formaldehyde, which are optionally aftertreated with phenol and formaldehyde, or condensation products of phenol with formaldehyde and sodium sulfite or mixtures thereof are used as dispersing agents.

9. A process as claimed in claim 1, wherein aqueous dye dispersions in which the primary particle size of the dye is about 1μ or less are the starting materials for the production of the granules.

10. A process as claimed in claim 1, wherein the concentration of dye in the aqueous formulation is from 5 to 40 percent by weight, based on the aqueous formulation.

11. A process as claimed in claim 1 wherein the separated portion of material removed from the fluidized bed has a particle size of about 0.5 to 2.5 mm.

* * * * *